United States Patent [19]

Baumgartner et al.

[11] 4,211,192
[45] Jul. 8, 1980

[54] CAMSHAFT FOR AN INTERNAL COMBUSTION ENGINE

[75] Inventors: Peter Baumgartner, Wiesendangen; Robert Kuhne, Frauenfeld, both of Switzerland

[73] Assignee: Sulzer Brothers Ltd., Winterthur, Switzerland

[21] Appl. No.: 856,487

[22] Filed: Dec. 1, 1977

[30] Foreign Application Priority Data

Dec. 10, 1976 [CH] Switzerland ............... 15565/76

[51] Int. Cl.² .................................................. F01L 1/04
[52] U.S. Cl. .................................. 123/90.6; 403/273; 403/336; 403/337; 29/447; 74/567
[58] Field of Search ............ 123/90.6; 74/567, 568 R; 64/1 R; 403/273, 336, 337; 29/447

[56] References Cited

U.S. PATENT DOCUMENTS

| 995,436 | 6/1911 | Bolthoff | 74/567 |
| 2,473,417 | 6/1949 | Essl | 74/568 |
| 2,552,724 | 5/1951 | Lang | 74/567 |
| 2,986,954 | 6/1961 | Werner | 74/567 |
| 3,447,395 | 6/1969 | Latour | 74/567 |
| 3,869,938 | 3/1975 | Schlotterbeck | 74/567 |
| 4,072,448 | 2/1978 | Loyd | 123/90.6 |

FOREIGN PATENT DOCUMENTS

| 717724 | 9/1965 | Canada | 403/273 |
| 1010323 | 6/1957 | Fed. Rep. of Germany | 123/90.6 |
| 2336241 | 6/1975 | Fed. Rep. of Germany | 123/90.6 |
| 157418 | 9/1932 | Switzerland | 74/567 |

Primary Examiner—Charles J. Myhre
Assistant Examiner—Jeffrey L. Yates
Attorney, Agent, or Firm—Kenyon & Kenyon

[57] ABSTRACT

The camshaft is constructed in portions each of which has an integral flange at one end and a releaseably secured discoid member at the other end. The flange of one shaft portion is secured to the discoid member of an adjacent shaft portion by means of screws. Each shaft portion has a plurality of cams shrink fitted thereon.

1 Claim, 2 Drawing Figures

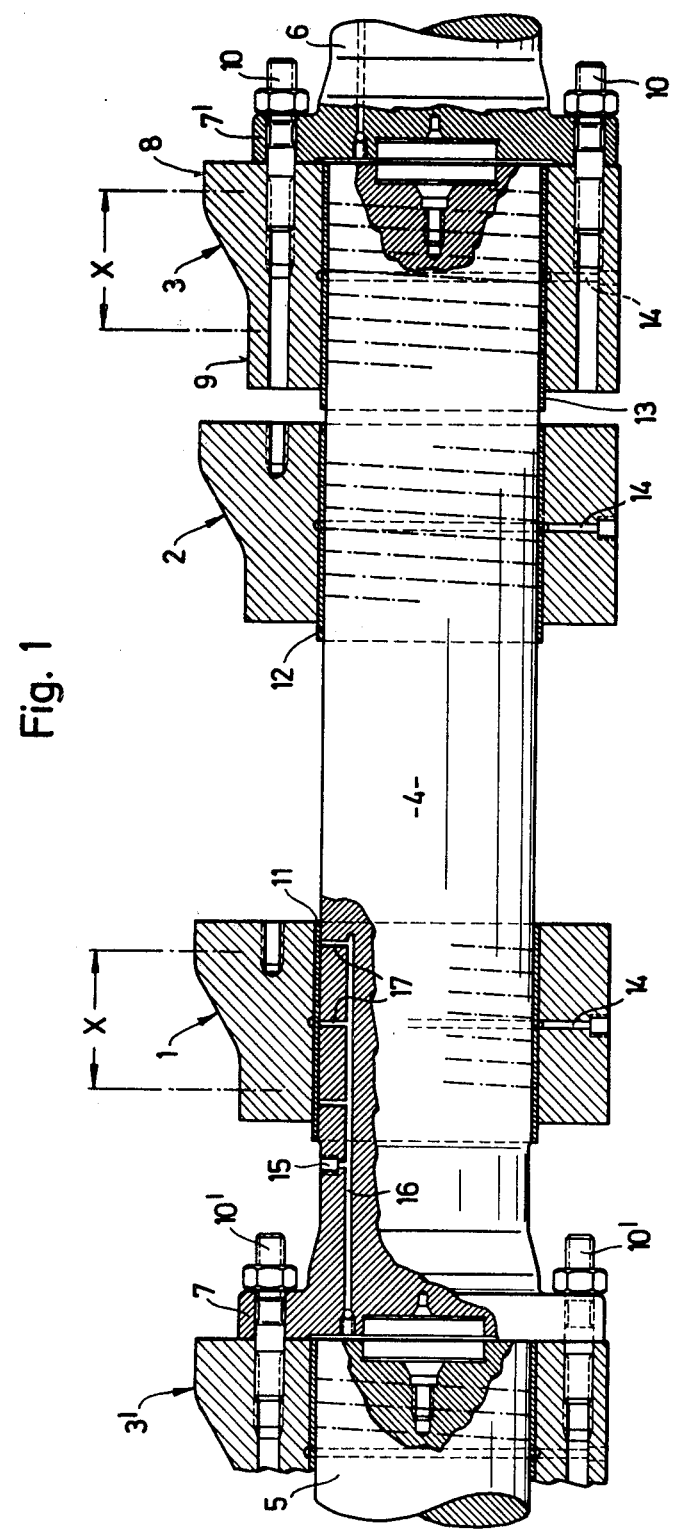

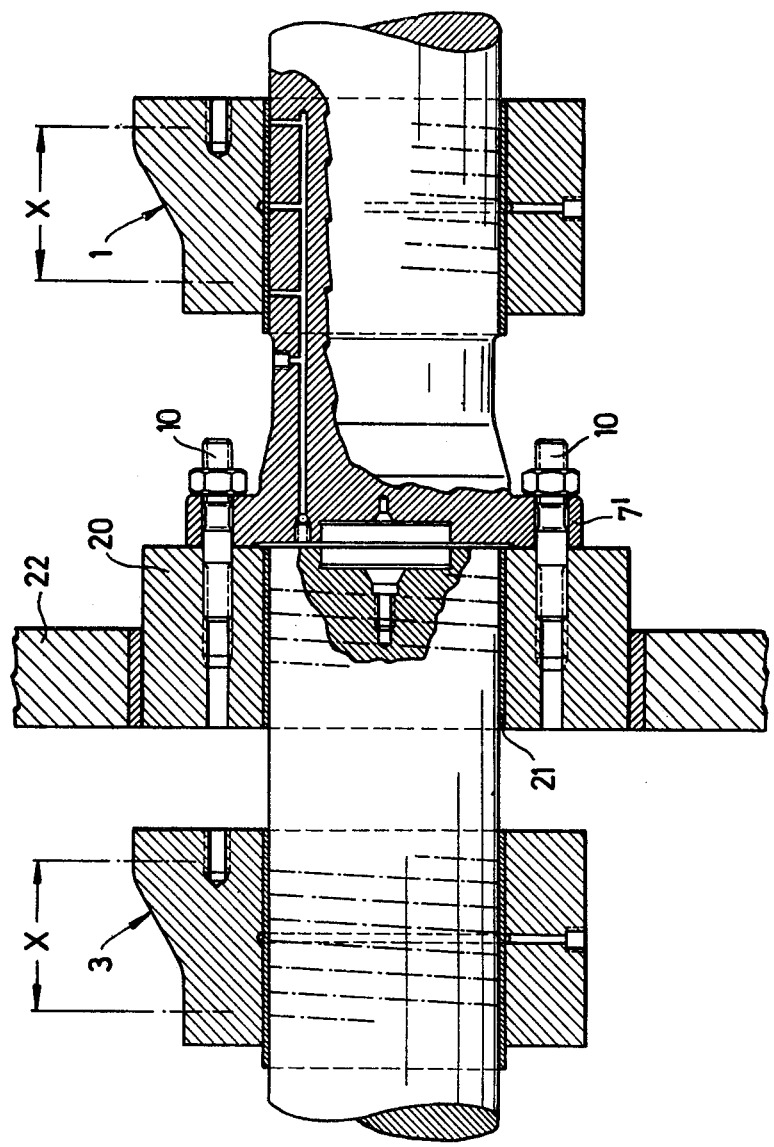

CAMSHAFT FOR AN INTERNAL COMBUSTION ENGINE

This invention relates to a camshaft and more particularly to a camshaft for an internal combustion engine.

As is known, various types of camshafts have been used for internal combustion engines. In many cases, unitary cams are releasably secured to the camshafts. However, if it becomes necessary to dismantle any single cam, all of the cams between the cam to be dismantled and the adjacent end of the camshaft must also be removed before the required cam can be removed. Accordingly, very elaborate procedures are required in order to fit the cams on the camshaft and to remove the cams from the camshaft.

In other camshaft arrangements, the cams are formed of two piece elements of a kind which can be dismantled without removal of the adjacent cams from a camshaft. However, transversely divided cams of this kind have to be threaded onto the camshaft and require screw connections which take up a considerable space axially of the camshaft. As a rule, there is usually insufficient space for these screw connections in the case of double cams as are normally used for reversible internal combustion engines.

Accordingly, it is an object of the invention to provide a camshaft from which a cam can be readily removed without having to remove a multiplicity of adjacent cams.

It is another object of the invention to provide a camshaft from which a cam may be readily removed.

Briefly, the invention provides a camshaft which is comprised of at least two camshaft portions which are disposed along a longitudinal axis of the shaft. Each shaft portion has a flange at one end and a releaseably secured discoid member at the opposite end. In addition, the flange of one shaft portion is releasably secured to a discoid member of an adjacent shaft portion. In order to secure a flange to a discoid member use is made of a plurality of screws.

In order to remove one cam shaft portion, the flange of one cam shaft portion is released from the discoid member of the other cam shaft portion.

The discoid members may be in the form of rings which have an outer bearing surface in order to journal the camshaft in an engine casing or in the form of cams which are used to program the operation of the engine. In either case, the rings or cams can be shrunk fit directly onto the camshaft portions or onto sleeves which are shrink-fitted onto the shaft portions. In this latter case, each sleeve may have a slightly conical outer surface onto which a ring or cam can be shrink-fitted in order to facilitate mounting and removal.

Each of the camshaft portions has a plurality of cams shrink-fitted thereon, for example two cams are shrunk fit onto each camshaft portion between a discoid member and a flange.

The subdivision of the camshaft into the coaxial portions is generally such that there is one camshaft portion per cylinder of the engine. Thus, when any single cam is to be dismantled, only a limited number of other cams have to be dismantled at the same time. If, for instance, there are three cams per cylinder, at most two other cams have to be dismantled as well as the required cam. In other words, only the cams associated with a single camshaft portion have to be dismantled.

These and other objects and advantages of the invention will become more apparent from the following detailed discription taken in conjunction with the accompanying drawings in which:

FIG. 1 illustrates an axially sectional view of a camshaft constructed in accordance with the invention; and FIG. 2 illustrates an axial sectional view of two camshaft portions which are secured together in accordance with the invention.

Referring to FIG. 1, the camshaft which is utilized for an internal combustion engine is comprised of a plurality, for example, three, coaxially disposed solid elongated camshaft portions 4, 5, 6 along a longitudinal axis of the shaft. Each of the camshaft portions 4,5,6 carries three cams 1,2,3. Since the camshaft portions 4,5,6 are of identical construction, only one will be described hereinafter.

As illustrated, the camshaft portion 4 has a flange 7 integrally formed thereon at one end. The opposite end of the camshaft portion 4 carries a cam 3 which is in the form of a discoid member and is releasably secured to that end of the camshaft portion 4. As shown, the right hand face of the cam 3 is flush with the right hand face of the camshaft portion 4. The cam 3 is a double cam and has two cam surfaces 8,9 which are offset from one another axially by a distance X. A roller (not shown) runs on one of these cam surfaces 8,9 and acts by way of a linkage (not shown) to operate, for example, an inlet valve of a cylinder of an internal combustion engine. Two cam surfaces are provided since the engine can be changed over between a forward direction and a reverse direction. Depending upon the direction in which the engine is to be run, one or the other of the cam surfaces 8,9 is brought into operation. The change over between the cams is effected by shifting the entire camshaft axially by the amount X.

The cam 2 is also a double cam similar to cam 3 and controls, for example, the exhaust valve of the same cylinder of the engine. The cam 1 which is disposed between the double cam 2 and the flange 7 is also a double cam similar to cam 2 and serves to control, for example, the fuel supply for the same engine cylinder. If required, the cam 1 can control the fuel supply to an adjacent cylinder. The camshaft portion is connected to the adjacent camshaft portion 6 via the cam 3 and the flange 7' of the portion 6. To this end, a plurality of screws such as screw threaded pin connectors 10 are used to secure the flange 7' to the cam or discoid member 3. As shown, the pins 10 thread into the cam 3 and each extends through an aperture in the flange 7'. Also, a nut is threaded onto each pin 10 to tighten the cam 3 against the flange 7'. The flange 7 of the camshaft portion 4 and the double cam 3' of the camshaft portion 5 are of identical construction and are releasably secured together by pins 10'.

Each of the cams 1, 2, 3 of a single camshaft portion are shrunk fit into place via the interposition of conical sleeves 11, 12, 13 so as to rotate with the camshaft portion. As shown, each sleeve 11, 12,13 is shrunk fit onto the camshaft portion 4 and each has an outer conical surface to receive the respective cams 1,2,3 in shrunk fit relation. Further, each cam 1,2,3 is formed with a radial bore 14 for passage of a pressurized medium to an inner surface thereof in order to permit removal of the cam from the shaft portion 4. For this purpose, each bore 14 may be connected with an external pressure oil line (not shown) so that pressurized oil can be supplied at a sufficiently high pressure that the particular cam concerned expands resiliently and can be pushed over the associated sleeve 11,12,13. When the pressure of the oil decreases, the cam returns to its normal size and tightly engages via the sleeve with the shaft portion.

Each shaft portion is also provided with an oil pressure line which communicates with an inside surface of at least one sleeve to deliver pressurized oil thereto to permit turning of the sleeve on the shaft portion. As shown, the oil pressure line includes a supply bore 15 which continues into an axial passage 16 in the camshaft portion 4 from which the three radial passages 17 branch off to terminate at the cylindrical inside surface of the sleeve 11. When pressure oil is supplied, this sleeve 11 and the cam 1 expand so that the cam 1 can be turned around a longitudinal axis of the shaft portion 4 for adjustment of the fuel supply timing. Similar oil pressure lines can be provided for the sleeves 12, 13, respectively.

In order to dismantle, for example the cam 1, the nuts on the pins 10, 10' are first unscrewed. Thereafter, the pins 10, 10' are threaded from the cams 3, 3' and withdrawn axially until passing through the associated flanges 7, 7'. If the camshaft portion 4 is itself mounted in the engine casing, for which purpose there would be sufficient space, for example, between the cams 1, 2, the cap of a bearing that would be used for such is removed. Thereafter, the shaft portion 4 together with the cams 1,2,3 are removed from the engine casing i.e. the shaft portion 4 is removed transversely of the longitudinal axis of the shaft from the other shaft portions 5, 6. The cams 1,2,3 can then be withdrawn from the shaft portion by sliding to the right as viewed. After a new cam 1 has been fitted in place, the previous cams 2,3 are shrink-fitted back on to the shaft portion 4 and the shaft portion 4 is reconnected to the two camshaft portions 5,6 in the reverse order to that described above.

Referring to FIG. 2, instead of utilizing a cam 3 as the discoid member for connecting two adjacent camshaft portions together, use may be made of a ring 20. As shown, the ring 20 is shrink-fitted to the shaft portion 40 via a sleeve 21 in a similar manner as described above. For the sake of simplicity, the various pressure oil supply ducts in the shaft portion and the pressure oil supply passage in the ring 20 have been omitted. In addition to interconnecting the two shaft portions, the ring 20 also acts as a bearing member for journaling the camshaft in the engine casing 22. Consequently, the outer periphery of the ring 20 is a bearing surface which, when the camshaft is in operation, rotates in a corresponding bearing bore in the casing 22. As above, the ring 20 and the adjacent flange 7' are interconnected via pins 10 which are threadably secured in ring 20. In general, the procedure for dismantling a shaft portion is the same as described above with respect to FIG. 1. However, when a cam is withdrawn, the ring 20 must be removed from the shaft portion. This extra step is compensated by a cost savings in the construction of the cam 3.

It is to be noted that the invention is not limited to camshafts having a sleeve between the shaft portion and cam and/or ring. Consequently, the subdivision of the camshaft is of use when unitary cams and/or ring are shrink-fitted onto the associated shaft portion directly or are connected to the shaft portions in some other way, such as by splining.

What is claimed is:

1. A cam shaft comprising
    a plurality of coaxially disposed elongated cam shaft portions, each shaft portion having an integral flange at one end;
    a discoid cam member releaseably secured at an opposite end of each shaft portion;
    a plurality of screws releaseably securing said flange of one shaft portion to a discoid member of an adjacent shaft portion; and
    a plurality of sleeves shrunk-fit on each shaft portion, each said sleeve having a conical outer surface;
    a plurality of cams mounted on each shaft portion, each said cam being shrunk-fit on a respective outer surface of a respective sleeve;
    an oil pressure line in each shaft portion communicating with an inside surface of at least one sleeve to deliver pressurized oil thereto to permit turning of said one sleeve on said shaft portion; and
    a radial bore in each respective cam for passage of a pressurized medium to an inner surface thereof to permit removal of said respective cam from said shaft portion.

* * * * *